US009699669B2

(12) United States Patent  
Chou

(10) Patent No.: US 9,699,669 B2  
(45) Date of Patent: Jul. 4, 2017

(54) STORING A VALUE OF A COUNTER FOR A WIRELESS LOCAL AREA NETWORK

(71) Applicant: Intel IP Corporation, Santa Clara, CA (US)

(72) Inventor: Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 236 days.

(21) Appl. No.: 14/575,876

(22) Filed: Dec. 18, 2014

(65) Prior Publication Data

US 2015/0309853 A1    Oct. 29, 2015

Related U.S. Application Data

(60) Provisional application No. 61/985,396, filed on Apr. 28, 2014.

(51) Int. Cl.
  *G06F 11/07* (2006.01)
  *H04W 24/02* (2009.01)

(52) U.S. Cl.
  CPC ........... *H04W 24/02* (2013.01); *G06F 11/076* (2013.01)

(58) Field of Classification Search
  CPC .......................... G06F 11/076; H04W 24/02
  See application file for complete search history.

(56) References Cited

U.S. PATENT DOCUMENTS

| 6,075,791 A * | 6/2000 | Chiussi ............... H04L 12/5693 370/412 |
| 9,516,558 B2 | 12/2016 | Chou |
| 2005/0221837 A1 | 10/2005 | Cha et al. |
| 2005/0237968 A1 | 10/2005 | Womack et al. |
| 2006/0079183 A1 | 4/2006 | Song et al. |
| 2009/0013127 A1 * | 1/2009 | Atkinson ............ H04B 17/318 711/106 |
| 2009/0285116 A1 * | 11/2009 | Nanda ................... H04W 72/02 370/252 |
| 2010/0110905 A1 | 5/2010 | An et al. |
| 2014/0107449 A1 * | 4/2014 | Ecoff ................ A61B 5/14532 600/365 |

FOREIGN PATENT DOCUMENTS

| WO | WO 2012-141395 A1 | 10/2012 |
| WO | WO 2012-141397 A1 | 10/2012 |

OTHER PUBLICATIONS

International Search Report and Written Opinion mailed Apr. 30, 2015 from International Application No. PCT/US2015/014249.

(Continued)

*Primary Examiner* — Omar Ghowrwal  
(74) *Attorney, Agent, or Firm* — Schwabe, Williamson & Wyatt, P.C.

(57) ABSTRACT

Embodiments described herein relate generally to a communication between an element manager and a wireless local area network (WLAN) access point (AP). The WLAN AP may be configured with one or more counters. The one or more counters may measure events, such as data transmission and/or reception at the WLAN AP or a carrier sense multiple access with collision avoidance (CSMA/CA) procedure by the WLAN AP. The element manager may be configured to read one or more of these counters and compute one or more values based on the values read from the one or more counters. The element manager may be configured to communicate the one or more computed values to a network manager. Other embodiments may be described and/or claimed.

23 Claims, 8 Drawing Sheets

(56) References Cited

OTHER PUBLICATIONS

3GPP, "Telecommunication management; Performance Management (PM); Performance measurements Wireless Local Area Network (WLAN) (Release 12)," 3GPP TS 28.403 V0.0.0 (Nov. 2013), Jan. 14, 2014, Lte Advanced, 10 pages.

3GPP, "Telecommunication management; Study on WLAN Management (Release 12)," 3GPP TR 32.841 V1.4.0 (Apr. 2014), Apr. 23, 2014, Lte Advanced, 13 pages.

Office Action issued Mar. 21, 2016 from Taiwan Patent Application No. 104106837, 15 pages.

3GPP, "Technical Specification Group Services and System Aspects; Telecommunication management; Performance Management (PM); Concept and requirements (Release 11)," 3GPP TS 32.401 V11.0.0 (Sep. 2012), Sep. 26, 2012, Lte Advanced, 29 pages.

IEEE Standard Association, "Part 11: Wireless LAN Medium Access Control (MAC) and Physical Layer (PHY) Specifications," IEEE Std 802.11™-2012 (Revision of IEEE Std 802.11-2007), IEEE Standard for Information Technology—Telecommunications and information exchange between systems Local and metropolitan area networks—Specific requirements, IEEE Computer Society, LAN/MAN Standards Committee, Mar. 29, 2012, New York, NY, 2,793 pages.

3GPP, "Technical Specification Group Services and System Aspects; Telecommunication management; Wireless Local Area Network (WLAN) Management Concepts and requirements (Release 12)," 3GPP TS 28.680 V0.1.0 (Feb. 2014), Feb. 26, 2014, Lte Advanced, 8 pages.

3GPP, "Technical Specification Group Services and System Aspects; Telecommunication management; Study on WLAN Management (Release 12)," 3GPP TR 32.841 V1.4.0 (Apr. 2014), Apr. 23, 2014, Lte Advanced, 13 pages.

\* cited by examiner

STORING A VALUE OF A COUNTER FOR A WIRELESS LOCAL AREA NETWORK

CROSS REFERENCE TO RELATED APPLICATIONS

This application claims priority under 35 U.S.C. §119(e) to U.S. Provisional Patent Application No. 61/985,396, entitled "Method and System To Measure Wlan Packet Error Rate" and filed Apr. 28, 2014. The disclosure of this provisional application is incorporated herein by reference.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Wireless local area networks are being examined to complement existing radio access networks. For example, network operators may deploy a plurality of wireless local area network (WLAN) nodes to mitigate traffic congestion caused by a surge of mobile data traffic. As a result, measurements associated with performance of base stations and/or access points may be beneficial to monitor the efficacy of offloading from a radio access network (RAN) to a WLAN. Since mobile data traffic may fluctuate rapidly and/or dynamically, the performance measurements are collected and/or correlated on a regular basis to identify any potential issues that may degrade the offloading performance. In turn, more WLAN nodes may be deployed in an area to improve offloading performance, or fewer WLAN nodes may be deployed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
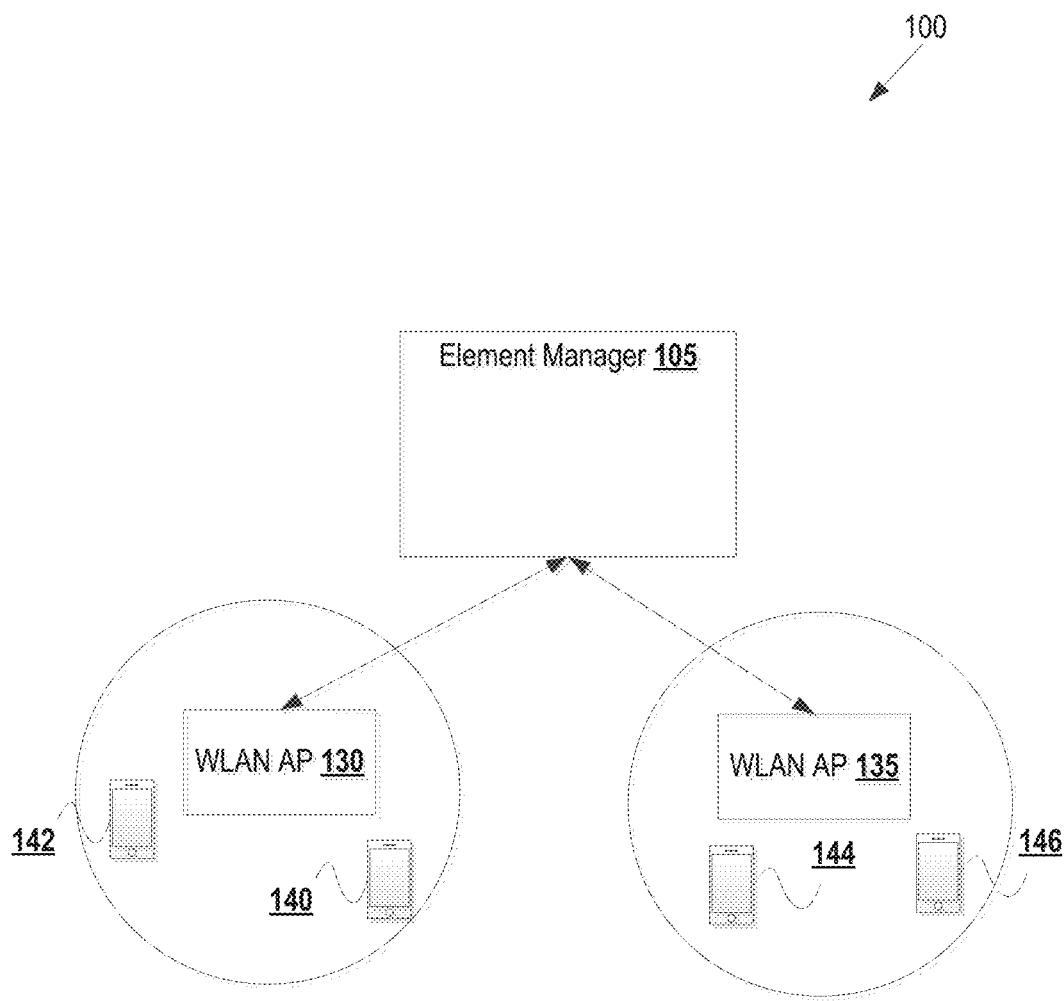
FIG. 1 is a block diagram illustrating an environment in which an element manager is configured to receive measurements associated with one or more WLAN access points, in accordance with various embodiments

Beginning first with FIG. 1, a block diagram shows an environment 100 in which an element manager 105 is configured to receive measurements associated with one or more WLAN access points (APs) 130-135, in accordance with various embodiments. In various embodiments, the element manager 105 may be a computing system, such as a server. The element manager 105 may be implemented using any combination of hardware and software on any network computing system, such as those shown in FIG. 1 and others that are not shown but are often found in wireless communication networks. Moreover, in various embodiments, one or more of the entities depicted in FIG. 1 may be implemented on the same or different computing systems.

The element manager 105 may be configured to communicate with the WLAN APs 130-135. Each of the WLAN APs 130-135 may be any computing device that allows wireless devices to connect, for example, to a wired network (e.g., a core network) according to one or more 3$^{rd}$ Generation Partnership Project (3GPP) technical specifications and/or another similar standard. The WLAN APs 130-135 may be configured to connect the user equipment (UE) 140-146 to a network for communication according to a third Generation (3G), fourth Generation (4G), fifth Generation (5G), or beyond system that adheres to one or more standards, such as Long Term Evolution (LTE), LTE-Advanced (LTE-A), Institute of Electrical and Electronics Engineers (IEEE) 802.11, or another similar standard. In various embodiments, the one or more standards may be promulgated by 3GPP.

In one embodiment, one of the WLAN APs 130-135 may be a femtocell or other low-powered radio access base station. In one embodiment, one of the WLAN APs 130-135 may include and/or be communicatively coupled with a router. In one embodiment, the element manager 105 may be integrated with one or both of the WLAN APs 130-135. In one embodiment, one of the WLAN APs 130-135 may be configured to receive an instruction from an evolved Node B (eNB) so that traffic may be offloaded by the eNB to the one of the WLAN APs 130-135.

Each of the UEs 140-146 may be any type of computing device equipped with broadband circuitry and adapted to operate on a cell according to, for example, 3GPP technical specifications. For example, one or both of the UEs 140-146 may be a netbook, a tablet computer, a handheld computing device, a web-enabled appliance, a gaming device, a mobile phone, a smartphone, an eBook reader, a personal data assistant, or the like. In another embodiment, one or both of the UEs 140-146 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

In various embodiments, traffic associated with the UEs 140-146 may be communicated through the WLAN APs 130-135. Such traffic may be, for example, according to a cellular protocol (e.g., an LTE and/or LTE-A protocol, Institute of Electrical and Electronics Engineers (IEEE) 802.11), a wireless protocol, and/or another wireless communication protocol. In embodiments, the WLAN APs 130-135 may be adapted to perform various measurements associated with the UEs 140-146. Such measurements may be defined by one or more groups. In various embodiments, one or more counters for measuring data may be defined by the Internet Engineering Task Force (IETF) and/or the Institute of Electrical and Electronics Engineers (IEEE).

A specification promulgated by IEEE may define a plurality of counters. The IEEE 802.11 provides a Management Information Database (IEEE802dot11-MIB) that defines counters for measuring transmitted and received data from and to the WLAN APs 130-135. A first counter (dot11TransmittedFrameCount) may measure a number of successfully transmitted media access control (MAC) service data units (MSDUs)—e.g., MSDUs associated with an acknowledgment indicating successful transmission. A second counter (dot11FailedCount) may measure a number of MSDUs that have not been successfully transmitted—e.g., MSDUs not associated with an acknowledgment indicating successful transmission. A third counter (dot11ReceivedFragmentCount) may measure a number of successfully received MAC protocol data units (MPDUs) of type data or management. A fourth counter (dot11FCSErrorCount) may measure a number of MPDUs that have been received with a frame check sequence (FCS) error.

Additionally, the IEEE 802.11 may define counters (e.g., in the IEEE802dot11-MIB) associated with carrier sense multiple access with collision avoidance (CSMA/CA). CSMA/CA may allow multiple nodes (e.g., WLAN APs 130-135 and UEs 140-146) to access a common wireless carrier without conflict. CSMA/CA protocol-related measurements may count a number of successful request to send (RTS) responses, failed RTS responses, and/or failed acknowledgment (ACK) responses that are associated with WLAN performance (e.g., performance of the WLAN APs 130-135 in communicating with the UEs 140-146). For example, a relatively high number of failed RTS and/or ACK responses may indicate that one of the UEs 140-146 and/or one of the WLAN APs 130-135 is having difficulty successfully transmitting data packets. A first counter (dot11RTSSuccessCount) may measure a number of clear to send (CTS) messages that are received in response to one or more RTS messages. A second counter (dot11RTSFailureCount) may measure a number of CTS messages that are not received in response to one or more RTS messages. A third counter (dot11ACKFailureCount) may measure a number of ACK responses that are not received after transmitting data from one of the WLAN APs 130-135. This third counter may directly track a number of inbound acknowledgments that are lost.

The WLAN APs 130-135 may be configured to increment, decrement, and/or otherwise modify a respective value of one or more of these counters based on the UEs 140-146. In various embodiments, one or more of the counters maintained at the WLAN APs 130-135 may increment based on traffic at the WLAN APs 130-135. As traffic to and from the UEs 140-146 is transmitted and received at the MAC layers of the WLAN APs 130-135, the WLAN APs 130-135 may increment the respective corresponding counter. In some embodiments, one or more of the counters may continuously increment. For example, dot11TransmittedFrameCount may continuously increment by one (1) when each octet is transmitted and received, respectively, and would wrap around to zero (0) when a limit of the counter is reached.

In embodiments, the element manager 105 may be adapted to read one or more of the counters of the WLAN APs. For example, the element manager 105 may be adapted to transmit a request to one of the WLAN APs 130-135 for one or more values of one or more counters. Based on the request, the one of the WLAN APs 130-135 may return the one or more requested values of the one or more counters. The element manager 105 may be adapted to store these values and/or compute other values based on the counter values.

Figure 2:
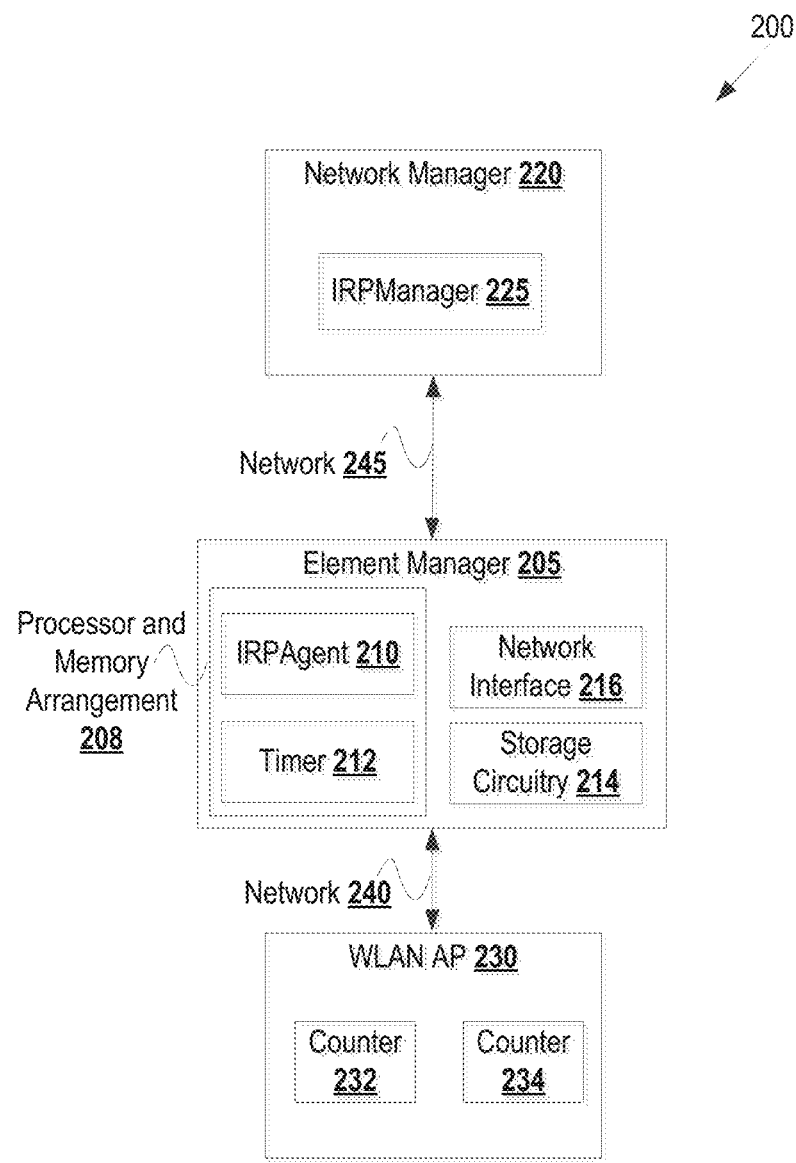
FIG. 2 is a block diagram illustrating an environment in which an element manager is to read one or more values of one or more counters at a WLAN AP and send computed values to a network manager based on the counter values, in accordance with various embodiments.

With respect to FIG. 2, a block diagram illustrates an environment 200 in which an element manager 205 is to read one or more values of one or more counters 232-234 at a WLAN AP 230 and send computed values to a network manager based on the counter values, in accordance with various embodiments. The element manager 205 may be an embodiment of the element manager 105 and the WLAN AP 230 may be an embodiment of one of the WLAN APs 130-135, as illustrated in FIG. 1.

In various embodiments, the network manager 220 may be a computing system, such as a server. The network manager 220 may be implemented using any combination of hardware and software on any network computing system, such as those shown in FIG. 2 and others that are not shown but are often found in wireless communication networks. Moreover, in various embodiments, one or more of the entities depicted in FIG. 2 may be implemented on the same or different computing systems.

The network manager 220 may include an integration reference point manager (IRPManager) 225. The IRPManager 225 may be configured to manage the WLAN AP 230, such as by sending and/or receiving management data to and/or from the element manager 205 over a Type-2 interface. The IRPManager 225 may be configured to receive one or more values from the element manager 205.

One of more of the network manager 220, the element manager 205, and/or the WLAN AP 230 may be controlled and/or managed by a network operator (e.g., a cellular operator). To enable WLAN to complement a network of an operator (e.g., a cellular network), measurements associated with the performance of the WLAN AP 230 may be helpful to the operator. Further, measurements associated with the performance of the WLAN AP 230 may allow the quality of service experienced by users to be monitored. As described herein, one or more counters may measure values associated with performance. For example, a packet error rate or statistics associated with CSMA/CA may be measured to reflect performance of the WLAN AP 230. In some embodiments, the counters 232-234 may be any of dot11TransmittedFrame Count, dot11FailedCount, dot11ReceivedFragmentCount, dot11FCSErrorCount, dot11RTSSuccessCount, dot11RTSFailureCount, and/or dot11ACKFailureCount. In another embodiment, one or both of the counters 232-234 may be another counter that is incremented, decremented, and/or otherwise modified based on successful or unsuccessful data transmission or reception by the WLAN AP 230. In another embodiment, one or both of the counters 232-234 may be another counter that is incremented, decremented, and/or otherwise modified based on a CSMA/CA procedure by the WLAN AP 230.

The element manager 205 may include a processor and memory arrangement 208. The processor and memory arrangement 208 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth.

The processor and memory arrangement 208 may be communicatively coupled with storage circuitry 214. Storage circuitry 214 may include one or more machine- (e.g., a computer-) readable storage media, such as read only memory (ROM), random access memory (RAM), magnetic disk storage media, optical storage media, and/or flash memory devices. The storage circuitry 214 may be configured to store one or more values in one or more data structures.

Additionally, the processor and memory arrangement 208 may be communicatively coupled with a network interface 216. The network interface 216 may include circuitry adapted to transmit and/or receive signals over a network (e.g., transmitter circuitry and/or receiver circuitry). The network interface 216 may be configured to communicate signals across various types of wired and/or wireless networks, such as a radio network, a WLAN, a fiber optic network, and/or other networks. Accordingly, the networks 240-245 are intended to represent a broad range of networks known in the art. Examples of networks 240-245 may include wired or wireless, local or wide area, private or public networks, including the Internet.

The processor and memory arrangement 208 may have loaded therein an integration reference point agent (IRPAgent) 210 and a timer 212. In some embodiments, the IRPAgent 210 may include the timer 212. In one embodiment, the IRPAgent 210 may cause the network interface 216 to communicate data over the networks 240-245 according to various approaches. For example, the IRPAgent 210 may cause data to be transmitted to and/or received from the WLAN AP 230 over the network 240 according to a simple network management protocol (SNMP). The IRPAgent 210 may cause data to be transmitted to and/or received from the network manager 220 over the network 245 via an Itf-N Type-2 Interface.

The IRPAgent 210 may be configured to read one or more counters 232-234. In various embodiments, the IRPAgent 210 may be configured to cause the network interface 216 to transmit a request over the network 240 for one or more values of one or more counters 232-234. In response to the request, the network interface 216 may receive, over the network 240, one or more values of the one or more counters 232-234. In various embodiments, the IRPAgent 210 may forward a value read from one of the counters 232-234.

In some embodiments, the IRPAgent 210 may read one or more of the counters 232-234 after a granularity period, which may be a predetermined period of time. The IRPAgent 210 may be configured to begin the timer 212 to measure the granularity period. After the timer 212 has elapsed, the IRPAgent 210 may read one or more of the counters 232-234. The IRPAgent 210 may be configured to store a value read from one or more of the counters 232-234 in the storage circuitry 214, such as in a data structure.

In embodiments, the IRPAgent 210 may be configured to transmit stored values to the IRPManager 225 at the network manager 220. In various embodiments, the IRPAgent 210 may store and compute values through a cumulative counter approach. In the cumulative counter approach, the IRPAgent 210 may store a running count of the event that is being counted (e.g., transmission or reception by the WLAN AP 230 at the MAC layer) during a granularity period, such as the duration of the timer 212.

In various embodiments, the IRPAgent 210 may be configured to store a plurality of values read from one or more of the counters 232-234, e.g., the IRPAgent 210 may store a previous value read from one of the counters 232-234 as well as a most-recent value read from the one of the counters 232-234. In some embodiments, the IRPAgent 210 may compute another value based on a plurality of values from one of the counters 232-234, e.g., the IRPAgent 210 may compute the other value based on comparison of a most-recent value and a previous value from one of the counters 232-234.

For some embodiments, one or both of the counters 232-234 may continuously increment by one (1) when an octet or a packet is transmitted or received and would return (e.g., wrap around) to zero (0) when the counter reaches its limit. Therefore, when the IRPAgent 210 reads one of the counters 232-234 when the timer 212 has elapsed, the one of the counters 232-234 may not reflect a value of the number of octets or packets that have been transmitted or received during the granularity period but would reflect a total value since the one of the counters 232-234 was first initialized to zero or last wrapped around. To address this, the IRPAgent 210 may be configured to compare a most-recent value and a previous value from the first counter 232 and compute an end value based on the comparison.

In some embodiments, the IRPAgent 210 may transmit the computed end value to the network manager 220. For example, computed end values may be transmitted based on one or more of dot11RTSSuccessCount, dot11RTSFailureCount, and/or dot11ACKFailureCount. These end values may reflect statistics for issues associated with CSMA/CA, such as failed RTS messages. After the CSMA/CA-associated end value is computed, the IRPAgent 210 may be configured to send the computed end value to the IRPManager 225 at the network manager 220. The IRPAgent 210 may then clear the one or more data structures that are to store the most-recent value of the one of the counters 232-234 and/or previous value of the one of the counters 232-234 or may overwrite those values of the one of the counters 232-234 in the one or more data structures based on subsequent readings of the one of the counters 232-234 at a next granularity period.

In some embodiments, the IRPAgent 210 may use a plurality of computed end values to compute an error rate value. Subsequently, the error rate value may be sent to the network manager 220. Packet error rate (PER) may be used to measure the performance of wireless networks. Measurements associated with WLAN PER may be based on successful and failed MSDU transmissions and/or the number of successful and failed MPDU receptions. Accordingly, for each granularity period, the IRPAgent 210 may read a first counter value 232 indicating a successful transmission or reception (e.g., dot11TransmittedFrameCount or dot11ReceivedFragmentCount) and a second counter value 234 indicating an unsuccessful or failed transmission or reception (e.g., dot11FailedCount or dot11FCSErrorCount). For example, the IRPAgent 210 may compute a PER value associated with MSDUs. This MSDU PER value may be computed as the quotient of an end value based on dot11FailedCount divided by the sum of the end value based on dot11TransmittedFrameCount plus the dot11FailedCount end value. Similarly, an MPDU PER value may be computed as the quotient of the end value of dot11FCSErrorCount divided by the sum of the end value of dot11ReceivedFragmentCount plus the dot11FCSErrorCount end value.

After the PER value is computed, the IRPAgent 210 may be configured to send the PER value to the IRPManager 225 at the network manager 220. The IRPAgent 210 may then clear the one or more data structures that are to store the most-recent value of the one of the counters 232-234 and/or previous value of the one of the counters 232-234 or may overwrite those values of the one of the counters 232-234 in the one or more data structures based on subsequent readings of the one of the counters 232-234 at a next granularity period.

These computed values (e.g., PER values and/or CSMA/CA-associated values) may be performance measurements collected by the IRPAgent 210 and/or the IRPManager 225 for management of the WLAN AP 230 (and other network management operations).

A computed value may be a single integer. In some embodiments, one or more of the computed values may be uniquely identified, for example, so that the IRPAgent 210 may specify the computed value to the IRPManager 225. The computed values may be of class type WLANManagementFunction. Further, these computed values may be applicable to packet-switched domains. These computed values may be applicable to combined Global System for Mobile Communications (GSM), Universal Mobile Telecommunications System (UMTS), and/or Evolved Packet System (EPS) systems, regardless of whether the measured event occurred on the GSM, UMTS, or EPS part of the system (e.g., for ifHCInUcastPkts, only one total (e.g., GSM, UMTS, and/or EPS) count is obtained for the measured event).

According to embodiments, a first CSMA/CA-associated value may be a number of CTS messages received in response to at least one RTS message transmitted by the WLAN AP 230, based on dot11RTSSuccessCount. The IRPAgent 210 may calculate this CSMA/CA-associated value based on the cumulative counter approach by reading dot11RTSSuccessCount. The IRPAgent 210 may read the value of dot11RTSSuccessCount at the beginning and end of each granularity period and calculate a difference between those two values as the CSMA/CA-associated value. However, the IRPAgent 210 may account for the wrapping around of the dot11RTSSuccessCount—e.g., if the ending value is less than the beginning value, then the IRPAgent 210 may calculate the CSMA/CA-associated value as the difference between the size of dot11RTSSuccessCount and the beginning value plus the ending value. This CSMA/CA-associated value may be uniquely identified by the identifier MAC.SuccRts.WlanAP.

According to embodiments, a second CSMA/CA-associated value may be a number of CTS messages that are not received in response to at least one RTS message transmitted by the WLAN AP 230, based on dot11RTSFailureCount. The IRPAgent 210 may calculate this CSMA/CA-associated value based on the cumulative counter approach by reading dot11RTSFailureCount. The IRPAgent 210 may read the value of dot11RTSFailureCount at the beginning and end of each granularity period and calculate a difference between those two values as the CSMA/CA-associated value. However, the IRPAgent 210 may account for the wrapping around of the dot11RTSFailureCount—e.g., if the ending value is less than the beginning value, then the IRPAgent 210 may calculate the CSMA/CA-associated value as the difference between the size of dot11RTSFailureCount and the beginning value plus the ending value. This CSMA/CA-associated value may be uniquely identified by the identifier MAC.FailRtsWlanAP.

According to embodiments, a third CSMA/CA-associated value may be a number of ACK messages not received in response to data transmitted by the WLAN AP 230, based on dot11ACKFailureCount. The IRPAgent 210 may calculate a CSMA/CA-associated value based on the cumulative counter approach by reading dot11ACKFailureCount. The IRPAgent 210 may read the value of dot11ACKFailureCount at the beginning and end of each granularity period and calculate a difference between those two values as the CSMA/CA-associated value. However, the IRPAgent 210 may account for the wrapping around of the dot11ACKFailureCount—e.g., if the ending value is less than the beginning value, then the IRPAgent 210 may calculate the CSMA/CA-associated value as the difference between the size of dot11ACKFailureCount and the beginning value plus the ending value. This CSMA/CA-associated value may be uniquely identified by the identifier MAC.FailAckWlanAP.

According to embodiments, a first measurement value to be used to compute a PER value may be a number of MSDUs that are successfully transmitted by the WLAN AP 230, based on dot11TransmittedFrameCount. The IRPAgent 210 may calculate a first measurement value based on the cumulative counter approach by reading dot11TransmittedFrameCount. The IRPAgent 210 may read the value of dot11TransmittedFrameCount at the beginning and end of each granularity period and calculate a difference between those two values as the first measurement value to be used to compute a PER value. However, the IRPAgent 210 may account for the wrapping around of the dot11TransmittedFrameCount—e.g., if the ending value is less than the beginning value, then the IRPAgent 210 may calculate the first measurement value as the difference between the size of dot11TransmittedFrameCount and the beginning value plus the ending value. This first measurement value to be used to compute a PER value may be uniquely identified by the identifier MAC.SuccMsduWlanAP.

According to embodiments, a second measurement value to be used to compute a PER value may be a number of MSDUs that are not successfully transmitted (e.g., not associated with an acknowledgment) by the WLAN AP 230, based on dot11FailedCount. The IRPAgent 210 may calculate a second measurement value based on the cumulative counter approach by reading dot11FailedCount. The IRPAgent 210 may read the value of dot11FailedCount at the beginning and end of each granularity period and calculate a difference between those two values as the second measurement value. However, the IRPAgent 210 may account for the wrapping around of the dot11FailedCount—e.g., if the ending value is less than the beginning value, then the IRPAgent 210 may calculate the second measurement value as the difference between the size of dot11FailedCount and the beginning value plus the ending value. This second measurement value to be used to compute a PER value may be uniquely identified by the identifier MAC.FailMsduWlanAP.

According to embodiments, a third measurement value to be used to compute a PER value may be a number of MPDUs received with an FCS error by the WLAN AP 230, based on dot11FCSErrorCount. The IRPAgent 210 may calculate a third measurement value to be used to compute a PER value based on the cumulative counter approach by reading dot11FCSErrorCount. The IRPAgent 210 may read the value of dot11FCSErrorCount at the beginning and end of each granularity period and calculate a difference between those two values as the third measurement value. However, the IRPAgent 210 may account for the wrapping around of the dot11FCSErrorCount—e.g., if the ending value is less than the beginning value, then the IRPAgent 210 may calculate the third measurement value as the difference between the size of dot11FCSErrorCount and the beginning value plus the ending value. This third measurement value may be uniquely identified by the identifier MAC.failedMpduWlanAP.

According to embodiments, a fourth measurement value to be used to compute a PER value may be a number of successfully received MPDUs of type data or management at the WLAN AP 230, based on dot11ReceivedFragmentCount. The IRPAgent 210 may cal-culate a fourth measurement value based on the cumulative counter approach by reading dot11ReceivedFragmentCount. The IRPAgent 210 may read the value of dot11ReceivedFragmentCount at the beginning and end of each granularity period and calculate a difference between those two values as the fourth measurement value. However, the IRPAgent 210 may account for the wrapping around of the dot11ReceivedFragmentCount—e.g., if the ending value is less than the beginning value, then the IRPAgent 210 may calculate the fourth measurement value as the difference between the size of dot11ReceivedFragmentCount and the beginning value plus the ending value. This fourth measurement value may be uniquely identified by the identifier MAC.SuccMpduWlanAP.

Figure 3:
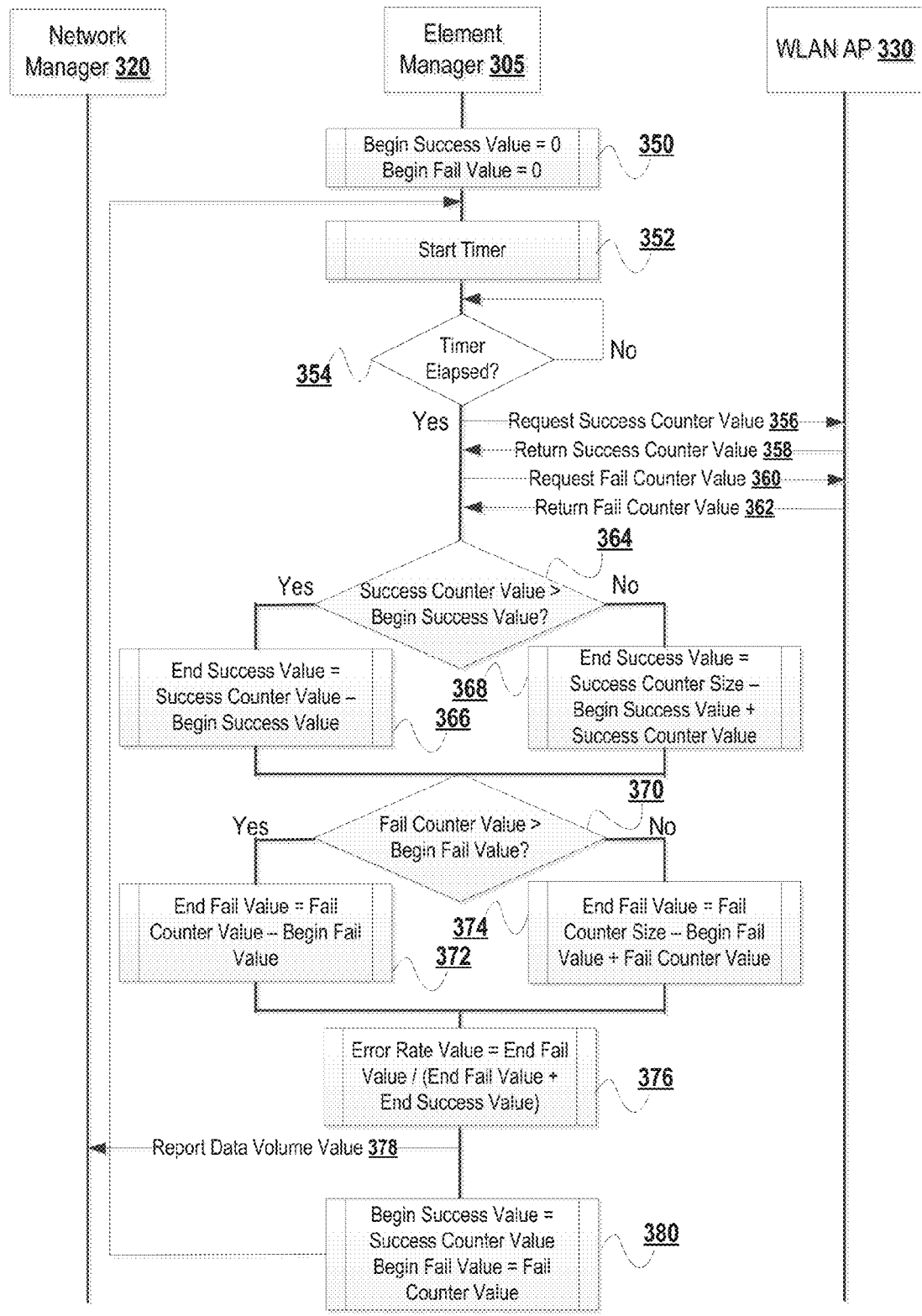
FIG. 3 is a sequence diagram illustrating systems and operations for computing an error rate value based on a plurality of counter values from a WLAN access point, in accordance with various embodiments.

With respect to FIG. 3, a sequence diagram illustrates systems and operations for computing a PER value based on a plurality of counter values from a WLAN AP 330, in accordance with various embodiments. The element manager 305 may be an embodiment of the element manager 105 and/or the WLAN AP 330 may be an embodiment of one of the WLAN APs 130-135 of FIG. 1 and/or the network manager 320 may be an embodiment of the network manager 220 of FIG. 2 and described herein.

The network manager 320 may collect error rate values (e.g., PER values) from one or more counters at the WLAN AP 330. The network manager 320 may be configured to collect error rate values over an Itf-N. Accordingly, the element manager 305 may be configured to read, at a predetermined interval, one or more counters at the WLAN AP 330 and to compute one or more error rate values for a granularity period.

Initially, the element manager 305 may set a begin success value and a begin fail value to 0, such as by setting and/or initializing one or more data structures in storage circuitry of the element manager 305 (operation 350). The element manager 305 may start a timer, which may be a duration of a granularity period (operation 352). Subsequently, the element manager 305 is to determine if the timer has elapsed (operation 354). After the element manager 305 detects that the timer has elapsed, the element manager 305 may send a request to the WLAN AP 330 for a value of a first counter associated with successful transmission or reception (e.g., dot11TransmittedFrameCount or dot11ReceivedFragmentCount) (operation 356). Responsive to the request, the element manager 305 may receive the value of the first counter (operation 358). The element manager 305 may store the received success counter value in a data structure.

Also after the element manager 305 detects that the timer has elapsed, the element manager 305 may send a request to the WLAN AP 330 for a value of a second counter associated with unsuccessful or failed transmission or reception (e.g., dot11FailedCount or dot11FCSErrorCount) (operation 360). Responsive to the request, the element manager 305 may receive the value of the first counter (operation 362). The element manager 305 may store the received fail counter value in a data structure.

Thereafter, the element manager 305 may compare the received success counter value to the begin success value (operation 364). If the received success counter value is greater than the begin success value (e.g., during a first iteration through operations 350-380), then the element manager 305 may set an end success value to the difference of the received success counter value minus the begin success value (operation 366). The element manager 305 may store the end success value in a data structure.

If the element manager 305 determines that the received success counter value is less than or equal to the begin success value, then the element manager 305 may set an end success value to a difference of the size of the success counter from which the value was requested minus the begin success value plus the received success counter value (operation 368). The size of the counter from which the success value was requested may be a value stored in a data structure in storage circuitry of the element manager 305 and/or received by the element manager 305 (e.g., from the WLAN AP 330 responsive to a request).

Additionally, the element manager 305 may compare the received fail counter value to the begin fail value (operation 370). If the received fail counter value is greater than the begin fail value (e.g., during a first iteration through operations 350-380), then the element manager 305 may set an end fail value to the difference of the received fail counter value minus the begin fail value (operation 372). The element manager 305 may store the end fail value in a data structure.

If the element manager 305 determines that the received fail counter value is less than or equal to the begin fail value, then the element manager 305 may set an end fail value to a difference of the size of the fail counter from which the value was requested minus the begin fail value plus the received fail counter value (operation 374). The size of the counter from which the fail value was requested may be a value stored in a data structure in storage circuitry of the element manager 305 and/or received by the element manager 305 (e.g., from the WLAN AP 330 responsive to a request).

Based on the end success and end fail values, the element manager 305 may compute an error rate value, such as a PER value (operation 376). In various embodiments, the element manager 305 may compute the error rate value as the quotient of the end fail value divided by the sum of the end fail value plus the end success value. Thereafter, the element manager 305 may send the compute error rate value to the network manager 320 (operation 378).

The element manager 305 may set the begin success value to the received success counter value, such as by setting a data structure, for additional iterations through various operations (operation 380). Additionally, the element manager 305 may set the begin fail value to the received fail counter value, such as by setting a data structure, for additional iterations through various operations (operation 380). The element manager 305 may then restart the timer to read an additional counter value for a next granularity period (return to operation 352).

While a comparison of the received success and/or fail counter values to the begin success and/or fail values may be unnecessary for a first iteration through operations for the element manager 305 (e.g., the received success and/or fail counter values will likely be greater than 0), setting the begin success and/or fail values to the received success and/or fail counter values and comparing those set begin success and/or fail values to next received success and/or fail counter values may be necessary to obtain an error rate value to report to the network manager 320. As the timer (e.g., granularity period) may be of a duration that allows a success and/or fail counter at the WLAN AP 330 to exceed its size and return to zero (i.e., wrap around), the comparison of the received success and/or fail counter values to the begin success and/or fail values (e.g., a previous counter value) may account for this scenario.

Figure 4:
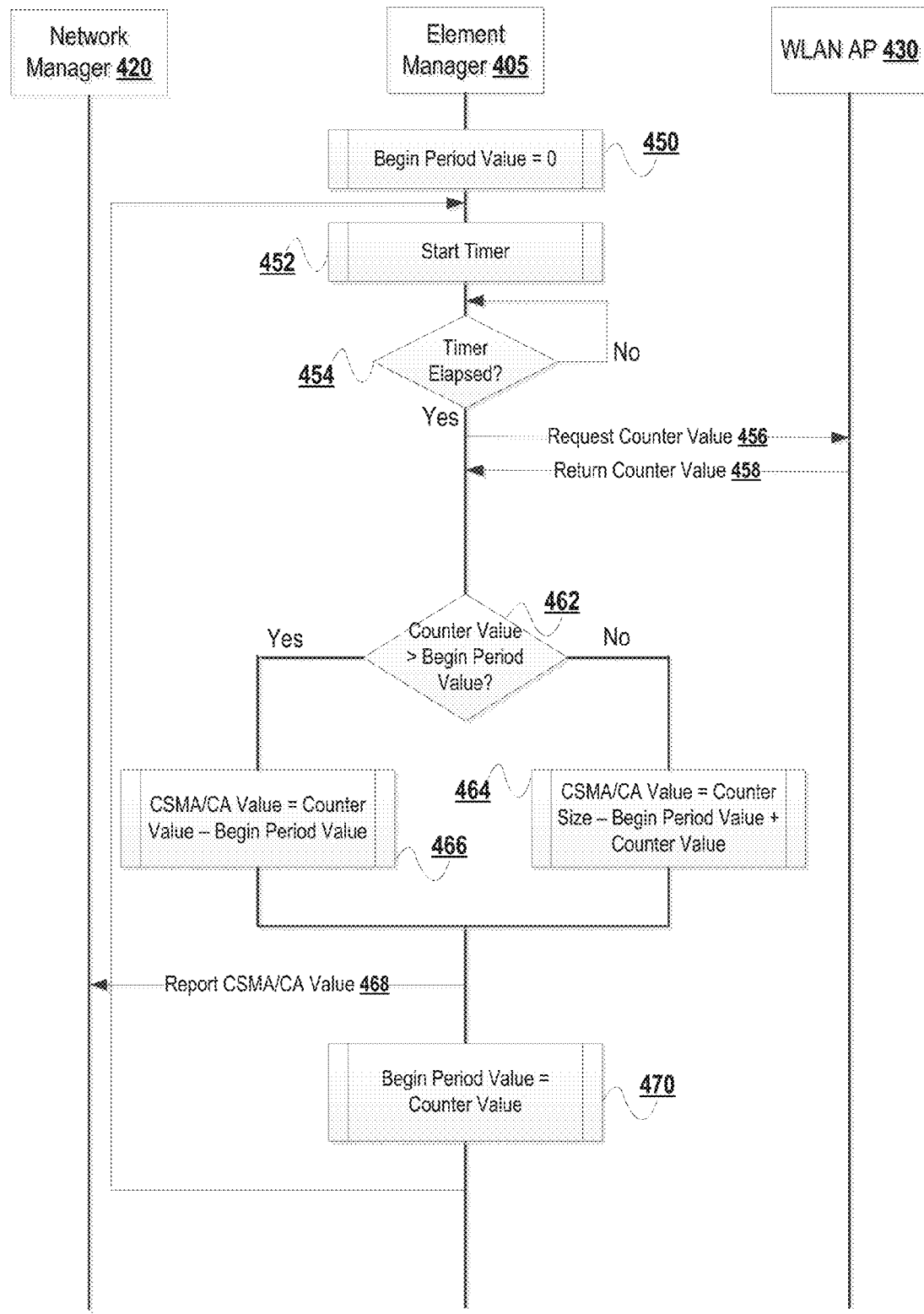
FIG. 4 is a sequence diagram illustrating systems and operations for computing values associated with a carrier sense multiple access with collision avoidance procedure based on a plurality of counter values from a WLAN access point, in accordance with various embodiments.

With respect to FIG. 4, a sequence diagram illustrates systems and operations for computing CSMA/CA-related values based on a plurality of counter values from a WLAN AP 430, in accordance with various embodiments. The element manager 405 may be an embodiment of the element manager 105 and/or the WLAN AP 430 may be an embodiment of one of the WLAN APs 130-135 of FIG. 1 and/or the network manager 420 may be an embodiment of the network manager 220 of FIG. 2 and described herein.

The network manager 420 may collect CSMA/CA-related values (e.g., RTS failures) from one or more counters at the WLAN AP 430, such as dot11RTSSuccessCount, dot11RTSFailureCount, and/or dot11ACKFailureCount. The network manager 420 may be configured to collect CSMA/CA-related values via a cumulative counter approach over an Itf-N. However, the one or more counters at the WLAN AP 430 may not be configured to support a cumulative counter approach (e.g., the counters may simply increment without resetting). Accordingly, the element manager 405 may be configured to sample, at a predetermined interval, the one or more counters and to compute CSMA/CA-related values, such as a number of failed RTS messages during a granularity period.

Initially, the element manager 405 may set a begin period value to 0, such as by setting and/or initializing a data structure in storage circuitry of the element manager 405 (operation 450). The element manager 405 may start a timer, which may be a duration of a granularity period (operation 452). Subsequently, the element manager 405 is to determine if the timer has elapsed (operation 454). After the element manager 405 detects that the timer has elapsed, the element manager 405 may send a request to the WLAN AP 430 for a value of a counter (operation 456). Responsive to the request, the element manager 405 may receive the value of the counter (operation 458). The element manager 405 may store the received counter value in a data structure.

Thereafter, the element manager 405 may compare the received counter value to the begin period value (operation 462). If the received counter value is greater than the begin period value (e.g., during a first iteration through operations 450-470), then the element manager 405 may set a CSMA/CA-related value to the difference of the received counter value minus the begin period value (operation 466). The element manager 405 may store the CSMA/CA-related value in a data structure.

If the element manager 405 determines that the received counter value is less than or equal to the begin period value, then the element manager 405 may set a CSMA/CA value to a difference of the size of the counter from which the value was requested minus the begin period value plus the received counter value (operation 464). The size of the counter from which the value was requested may be a value stored in a data structure in storage circuitry of the element manager 405 and/or received by the element manager 405 (e.g., from the WLAN AP 430 responsive to a request).

Subsequently, the element manager 405 may report the CSMA/CA-related value to the network manager 420 (operation 468). The element manager 405 may then set the begin period value to the receive counter value, such as by setting a data structure, for additional iterations through various operations (operation 470). The element manager 405 may then restart the timer to read an additional counter value for a next granularity period (return to operation 452).

While a comparison of the received counter value to the begin period value may be unnecessary for a first iteration through operations for the element manager 405 (e.g., the received counter value will likely be greater than 0), setting the begin period value to the received counter value and comparing that set begin period value to a next received counter value may be necessary to obtain an accurate CSMA/CA-related value to report to the network manager 420. As the timer (e.g., granularity period) may be of a duration that allows the counter at the WLAN AP 430 to exceed its size and return to zero (i.e., wrap around), the comparison of the received counter value to the begin period value (e.g., a previous counter value) may account for this scenario.

Figure 5:
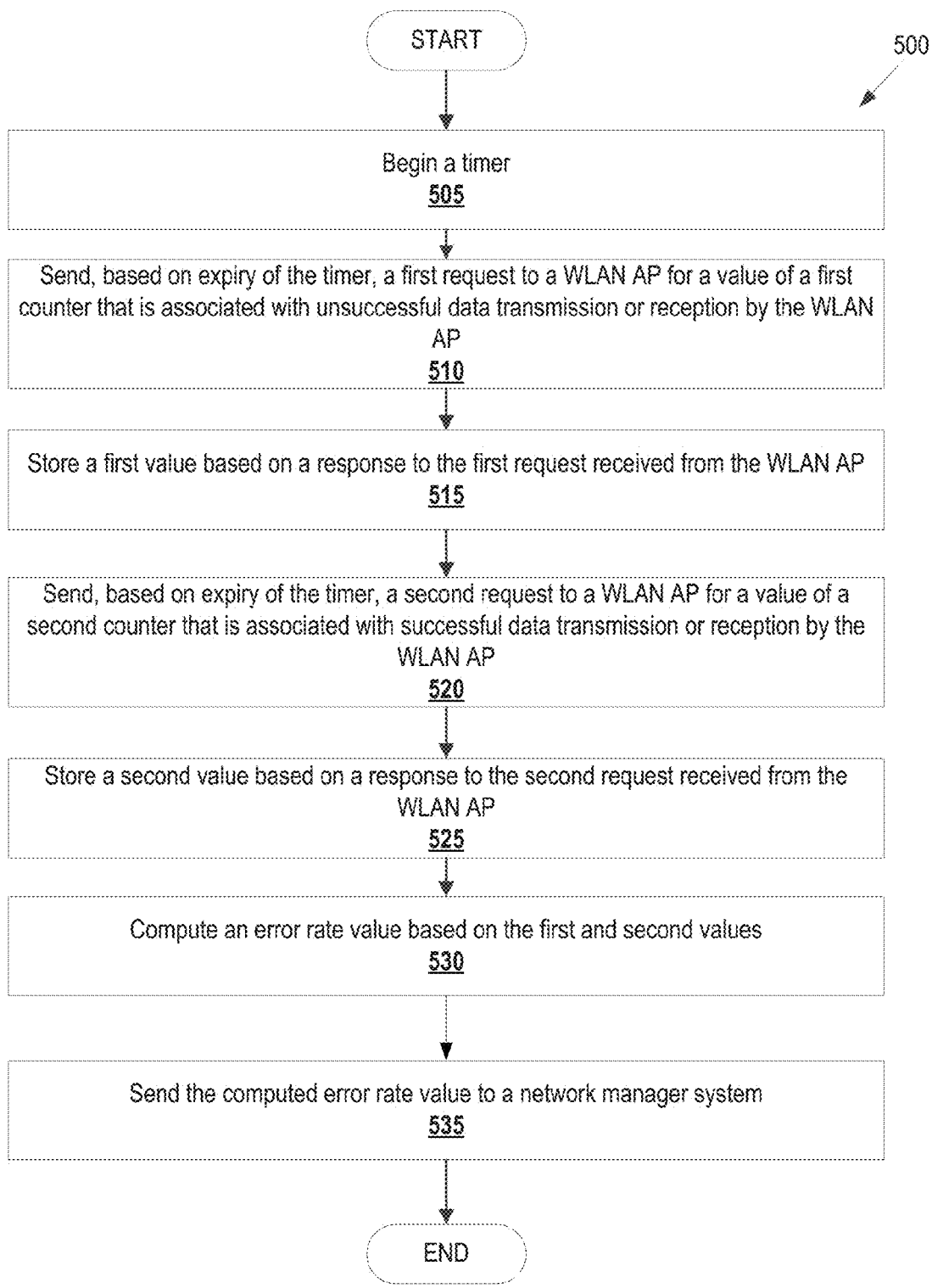
FIG. 5 is a flow diagram illustrating a method for computing an error rate value based on a plurality of received counter values, in accordance with various embodiments.

Turning to FIG. 5, a flow diagram illustrates a method 500 for computing an error rate value based on a plurality of received counter values, in accordance with various embodiments. The method 500 may be performed by an element manager, such as the element manager 105 of FIG. 1. While FIG. 5 illustrates a plurality of sequential operations, one of ordinary skill would understand that one or more operations of the method 500 may be transposed and/or performed contemporaneously.

To begin, the method 500 may include operation 505 for beginning a timer. Operation 510 may include sending, based on expiry of the timer, a first request to a WLAN AP for a first value of a first counter that is based on data that has been unsuccessfully transmitted or received by the WLAN AP. For example, the first counter may indicate data received with an error (e.g., dot11FCSErrorCount) or data that has not been acknowledged or otherwise failed (e.g., dot11FailedCount). Subsequently, operation 515 may include storing, based on a response to the first request, the first value of the first counter from the WLAN AP. The first value may be stored in a data structure in storage circuitry. The first request and the first value may be sent and received, respectively, using SNMP.

Operation 520 may include sending, based on expiry of the timer, a second request to the WLAN AP for a second value of a second counter that is based on data that has been successfully transmitted or received by the WLAN AP. For example, the second counter may indicate data received without an error (e.g., dot11ReceivedFragmentCount) or data that has acknowledged (e.g., dot11TransmittedFrameCount). Subsequently, operation 525 may include storing, based on a response to the second request, the second value of the second counter from the WLAN AP. The second value may be stored in a data structure in storage circuitry. The second request and the second value may be sent and received, respectively, using SNMP.

At operation 530, the method 500 may include computing an error rate value based on the stored first and second values. For example, operation 530 may include computing an error rate by summing the first and second values and dividing the first value (e.g., the value associated with unsuccessful transmissions or receptions at the WLAN AP) by the sum. Thereafter, operation 535 may include sending the computed error rate value to a network manager system. The computed error rate value may be sent using Itf-N.

Figure 6:
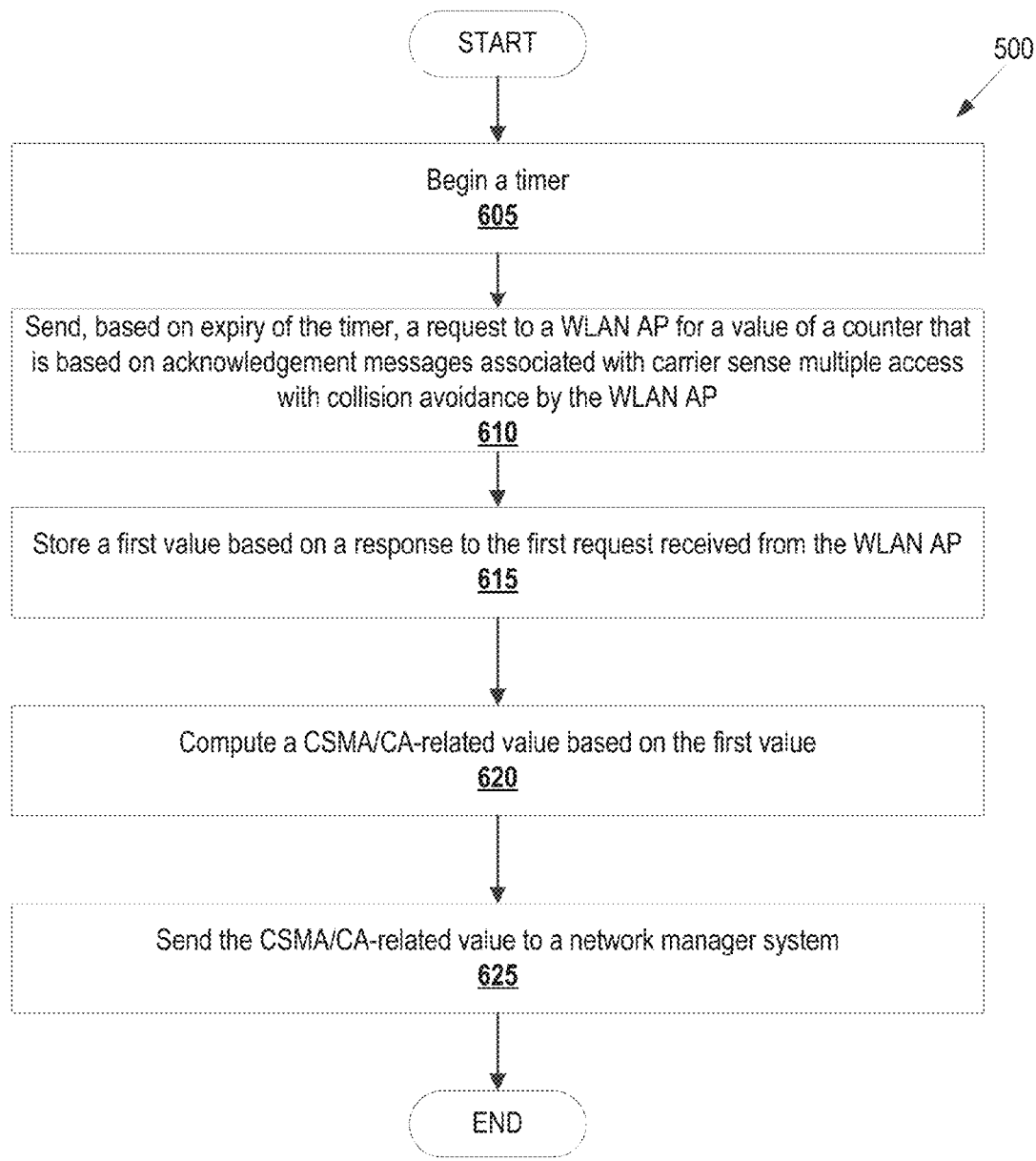
FIG. 6 is a flow diagram illustrating a method for computing a value associated with carrier sense multiple access with collision avoidance based on one or more received counter values, in accordance with various embodiments.

In reference to FIG. 6, a flow diagram illustrates a method 600 for computing a CSMA/CA-associated value based on one or more received counter values, in accordance with various embodiments. The method 600 may be performed by an element manager, such as the element manager 105 of FIG. 1. While FIG. 6 illustrates a plurality of sequential operations, one of ordinary skill would understand that one or more operations of the method 600 may be transposed and/or performed contemporaneously.

To begin, the method 600 may include operation 605 for beginning a timer. Operation 610 may include sending, based on expiry of the timer, a request to a WLAN AP for a value of a counter that is based on acknowledgment messages associated with CSMA/CA by the WLAN AP. Subsequently, operation 615 may include storing, based on a response to the request, the value of the counter from the WLAN AP. The request and the value may be sent and received, respectively, using SNMP.

At operation 620, the method 600 may include computing a CSMA/CA-related value based on the stored value of the counter. In various embodiments, operation 620 may include one or more operations to account for when the size of the counter has been exceeded and/or the counter restarted. For example, operation 620 may include operations associated with comparing the stored first value to at least one other value (e.g., a previous value of the counter received from the WLAN AP) and computing the CSMA/CA-related value based on the received value and the at least one other value.

Thereafter, operation 625 may include sending the computed first value to a network manager system. This value may be sent using Itf-N.

Figure 7:
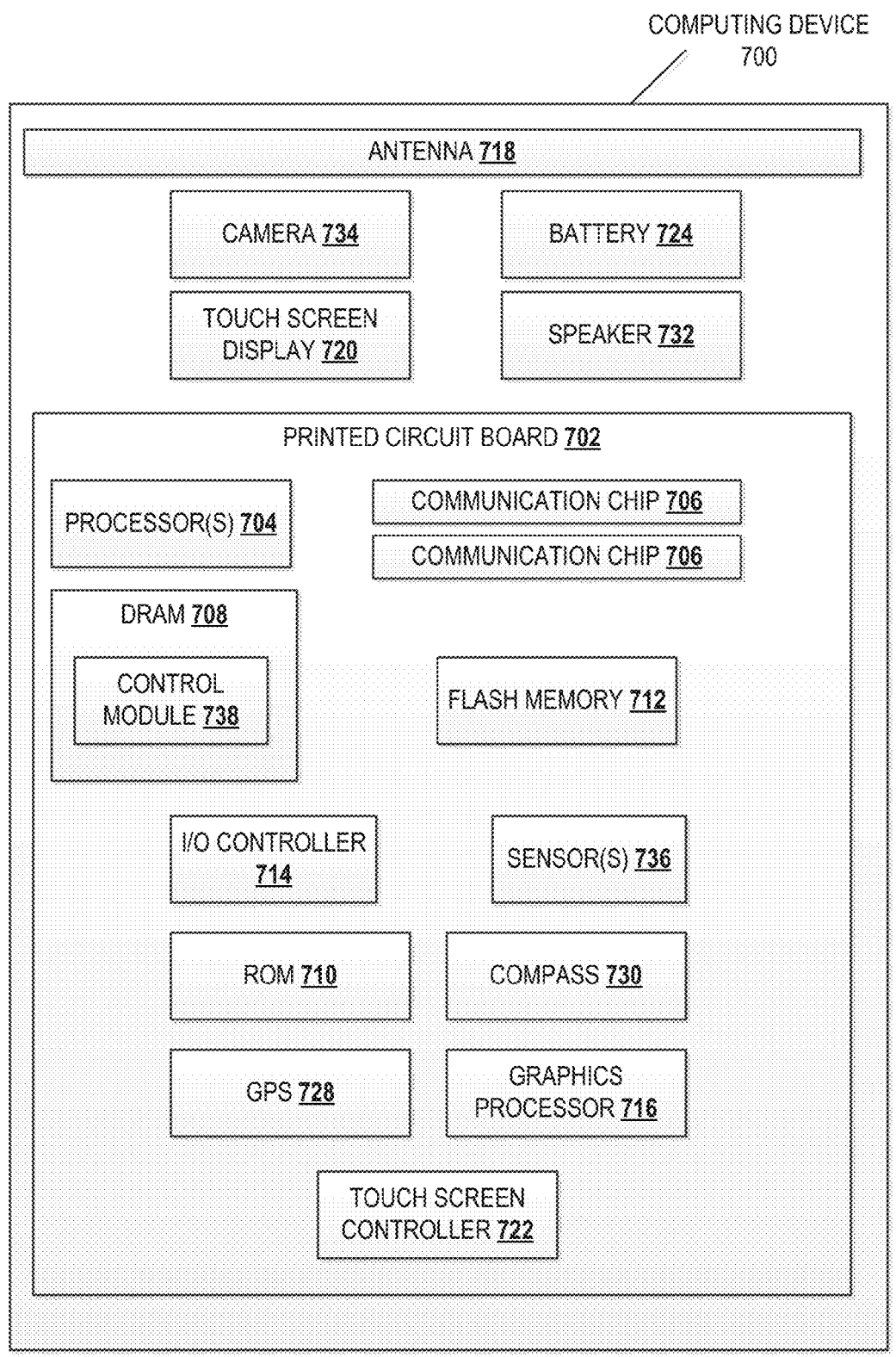
FIG. 7 is a block diagram illustrating a computing device adapted to operate in a communication network, in accordance with various embodiments.

Now with reference to FIG. 7, a block diagram illustrates an example computing device 700, in accordance with various embodiments. The element manager 105 and/or one of the WLAN APs 130-135 of FIG. 1 and/or the network manager 220 of FIG. 2 and described herein may be implemented on a computing device such as computing device 700. Further, the computing device 700 may be adapted to perform one or more operations of the method 500 described with respect to FIG. 5 and/or the method 600 described with respect to FIG. 6. The computing device 700 may include a number of components, one or more processors 704, and one or more communication chips 706. Depending upon the embodiment, one or more of the enumerated components may comprise "circuitry" of the computing device 700, such as processing circuitry, communication circuitry, and the like. In various embodiments, the one or more processor(s) 704 each may be a processor core. In various embodiments, the one or more communication chips 706 may be physically and electrically coupled with the one or more processor(s) 704. In further implementations, the communication chips 706 may be part of the one or more processor(s) 704. In various embodiments, the computing device 700 may include a printed circuit board (PCB) 702. For these embodiments, the one or more processor(s) 704 and communication chip 706 may be disposed thereon. In alternate embodiments, the various components may be coupled without the employment of the PCB 702.

Depending upon its applications, the computing device 700 may include other components that may or may not be physically and electrically coupled with the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna(s) 718, a display (not shown), a touch screen display 720, a touch screen controller 722, a battery 724, an audio codec (not shown), a video code (not shown), a global navigation satellite system 728, a compass 730, an accelerometer (not shown), a gyroscope (not shown), a speaker 732, a camera 734, one or more sensors 736 (e.g., a barometer, Geiger counter, thermometer, viscometer, rheometer, altimeter, or other sensor that may be found in various manufacturing environments or used in other applications), a mass storage device (e.g., a hard disk drive, solid state drive, compact disk and drive, digital versatile disk and drive, etc.) (not shown), and the like. In various embodiments, the one or more processor(s) 704 may be integrated on the same die with other components to form a system on a chip (SOC).

In various embodiments, volatile memory (e.g., DRAM 708), non-volatile memory (e.g., ROM 710), flash memory 712, and the mass storage device (not shown) may include programming instructions configured to enable the computing device 700, in response to the execution by one or more processor(s) 704, to practice all or selected aspects of the data exchanges and methods described herein, depending on the embodiment of the computing device 700 used to implement such data exchanges and methods. More specifically, one or more of the memory components (e.g., DRAM 708, ROM 710, flash memory 712, and the mass storage device) may include temporal and/or persistent copies of instructions that, when executed by one or more processor(s) 704, enable the computing device 700 to operate one or more modules (e.g., control module 738) configured to practice all or selected aspects of the data exchanges and method described herein, depending on the embodiment of the computing device 700 used to implement such data exchanges and methods.

The communication chips 706 may enable wired and/or wireless communication for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 706 may implement any of a number of wireless standards or protocols, including but not limited to LTE, LTE-A, Institute of Electrical and Electronics Engineers (IEEE) 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data Rates for GSM Evolution (EDGE), Code Division Multiple Access (CDMA), Time Division Multiple Access (TDMA), Digital Enhanced Cordless Telecommunications (DECT), personal area network protocols (for example, BLUETOOTH), derivatives thereof, as well as other wireless protocols that are designated as 3G, 4G, 5G, and beyond. The computing device 700 may include a plurality of communication chips 706 adapted to perform different communication functions. For example, a first communication chip 706 may be dedicated to shorter range wireless communications, such as local area network or personal area network communications (for example, WI-FI and or BLUETOOTH communications), whereas a second communication chip 706 may be dedicated to longer range wireless communications, such as wireless communication standards including, but not limited to, GPS, EDGE, GPRS, CDMA, WIMAX, LTE, LTE-A, Ev-DO, and the like.

Figure 8:
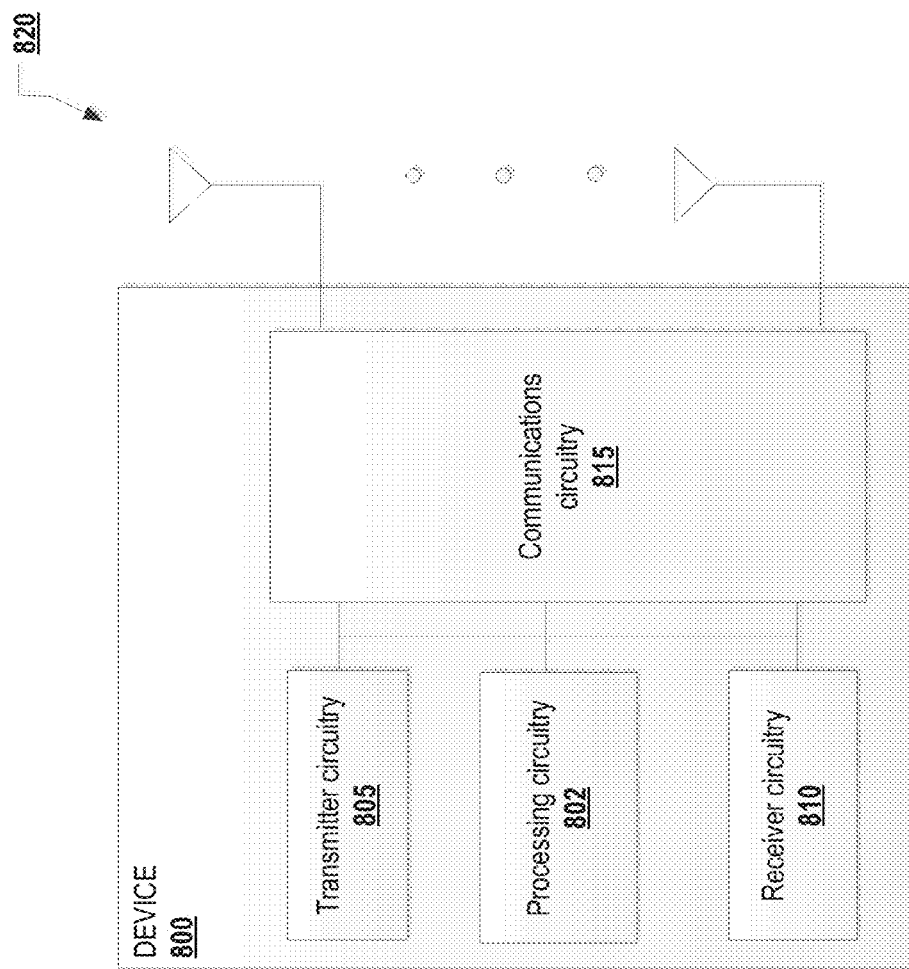
FIG. 8 is a block diagram illustrating a transmitting and receiving device, in accordance with various embodiments.

FIG. 8 illustrates a device 800 in accordance with some embodiments. The device 800 may be similar to and/or included in one or more of the element manager 105 and/or one of the WLAN APs 130-135 of FIG. 1 and/or the network manager 220 of FIG. 2 and described herein. The device 800 may include processing circuitry 802, transmitter circuitry 805, receiver circuitry 810, communications circuitry 815, and one or more antennas 820 coupled with each other at least as shown.

Briefly, the communications circuitry 815 may be coupled with the antennas 820 to facilitate over-the-air communication of signals to/from the device 800. Operations of the communications circuitry 815 may include, but are not limited to, filtering, amplifying, storing, modulating, demodulating, transforming, etc.

The transmitter circuitry 805 may be coupled with the communications circuitry 815 and may be configured to provide signals to the communications circuitry 815 for transmission by the antennas 820. In various embodiments, the transmitter circuitry 805 may be configured to provide various signal processing operations on the signal to provide the signal to the communications circuitry 815 with appropriate characteristics. In some embodiments, the transmitter circuitry 805 may be adapted to generate signals. Further, the transmitter circuitry 805 may be adapted to scramble, multiplex, and/or modulate various signals prior to transmission by the communications circuitry 815.

The receiver circuitry 810 may be coupled with the communications circuitry 815 and may be configured to receive signals from the communications circuitry 815. In some embodiments, the receiver circuitry 810 may be adapted to generate signals. Further, the receiver circuitry 810 may be adapted to descramble, de-multiplex, and/or demodulate various signals following reception by the communications circuitry 815.

The processing circuitry 802 may be coupled with the transmitter circuitry 805, the receiver circuitry 810, and/or the communications circuitry 815. The processing circuitry 802 may be adapted to perform operations described herein with respect to an element manager, a network manager, and/or a WLAN AP. In some embodiments, the processing circuitry 802 may be adapted to generate, process, and/or manipulate data that is to be transmitted over the air or over an electrical connection (e.g., a network), e.g., to and/or from an element manager, a network manager, and/or a WLAN AP.

Some or all of the communications circuitry 815, transmitter circuitry 805, and/or receiver circuitry 810 may be included in, for example, a communication chip and/or communicatively coupled with a printed circuit board as described with respect to FIG. 7.

In various embodiments, example 1 may be an element manager comprising: storage circuitry to store a first value associated with successful transmission or reception by a wireless local area network access point and a second value associated with errors in transmission or reception by the wireless local area network access point; a timer that is to elapse after a predefined period; and an integration reference point agent, coupled with the timer and the storage circuitry, to: begin the timer, detect that the timer has elapsed, read, based on the detection that the timer has elapsed, a value of a first counter that is based on successful transmission or reception by the wireless local area network access point, store the first value in the storage circuitry based on the value of the first counter, read, based on the detection that the timer has elapsed, a value of a second counter that is based on errors in transmission or reception by the wireless local area network access point, store the second value in the storage circuitry based on the value of the second counter, and compute an error rate value based on the first and second values stored in the storage circuitry. Example 2 may include the element manager of claim 1, wherein the integration reference point agent is to compute the error rate value based on the first and second values via division of the second value by a sum of the first value and the second value. Example 3 may include the element manager of claim 1, wherein the first counter is to indicate a number of media access control service data units that have been successfully transmitted by the wireless local area network access point, and wherein the second counter is to indicate a number of media access control service data units that have not been successfully transmitted by the wireless local area network access point. Example 4 may include the element manager of claim 1, wherein the first counter is to indicate a number of media access control protocol data units of type data or management that have been successfully received by the wireless local area network access point, and wherein the second counter is to indicate a number of media access control protocol data units that have been received with a frame sequence check error by the wireless local area network access point. Example 5 may include the element manager of claim 1, wherein the first counter is to indicate a number of clear to send messages received in response to one or more ready to send messages by the wireless local area network access point and the second counter is to indicate a number of clear to send messages not received in response to one or more ready to send messages by the wireless local area network access point. Example 6 may include the element manager of any of claims 1-5, wherein the integration reference point agent is to read the value of the first counter via transmission, to the wireless local area network access point, of a request for the value of the first counter and reception, from the wireless local area network access point, of the value of the first counter, and wherein the integration reference point agent is to read the value of the second counter via transmission, to the wireless local area network access point, of a request for the value of the second counter and reception, from the wireless local area network access point, of the value of the second counter. Example 7 may include the element manager of any of claims 1-5, wherein the integration reference point agent is to store the first value in the storage circuitry based on comparison of the value of the first counter to a previous value of the first counter. Example 8 may include the element manager of any of claims 1-5, wherein the integration reference point agent is to store the second value in the storage circuitry based on comparison of the value of the second counter to a previous value of the second counter. Example 9 may include the element manager of any of claims 1-5, wherein the integration reference point agent is to cause the error rate value to be transmitted to a network manager having an integration reference point manager. Example 10 may include the element manager of claim 9, further comprising: a network interface, coupled with the integration reference point agent, to transmit the error rate value to the network manager.

In various embodiments, example 11 may be an element manager comprising: storage circuitry to store a first value associated with a failed data transmission by a wireless local area network access point; a timer that is to elapse after a predefined period; and an integration reference point agent, coupled with the timer and the storage circuitry, to: begin the timer, detect that the timer has elapsed, read, based on the detection that the timer has elapsed, a value of a counter that is based on failure to detect one or more acknowledgment messages associated with data transmission by the wireless local area network access point, and store the first value in the storage circuitry based on the value of the counter. Example 12 may include the element manager of claim 11, wherein the counter is associated with carrier sense multiple access with collision avoidance. Example 13 may include the element manager of claim 11, wherein the integration reference point agent is to store the first value based on comparison of the value of the counter to a previous value of the counter. Example 14 may include the element manager of claim 11, wherein the integration reference point agent is to read the value of the counter via transmission, to the wireless local area network access point, of a request for the value of the counter and reception, from the wireless local area network access point, of the value of the counter. Example 15 may include the element manager of claim 14, wherein the integration reference point agent is to transmit the request and receive the value of the counter using a simple network management protocol. Example 16 may include the element manager of any of claims 11-15, wherein the integration reference point agent is to cause the first value to be transmitted to a network manager having an integration reference point manager. Example 17 may include the element manager of claim 16, further comprising: a network interface, coupled with the integration reference point agent, to transmit the first value to the network manager.

In various embodiments, example 18 may be one or more non-transitory computer-readable media comprising executable instructions, wherein the instructions, in response to execution by a computing system, cause the computing system to: begin a timer; send, based on expiry of the timer, a first request to a wireless local area network access point for a value of a first counter associated with successful transmission or reception by the wireless local area network access point; store a first value based on a response to the first request received from the wireless local area network access point; send, based on expiry of the timer, a second request to a wireless local area network access point for a value of a second counter associated with unsuccessful transmission or reception by the wireless local area network access point; store a second value based on a response to the second request received from the wireless local area network access point; compute an error rate value based on the first and second values; and send the computed error rate value to a network manager system. Example 19 may include the one or more non-transitory computer-readable media of claim 18, wherein the computation of the error rate comprises instructions to: sum the first value and the second value; and divide the second value by the sum. Example 20 may include the one or more non-transitory computer-readable media of claim 18, wherein the first counter is to indicate a number of media access control service data units that have been successfully transmitted by the wireless local area network access point, and wherein the second counter is to indicate a number of media access control service data units that have not been successfully transmitted by the wireless local area network access point. Example 21 may include the one or more non-transitory computer-readable media of claim 18, wherein the first counter is to indicate a number of media access control protocol data units of type data or management that have been successfully received by the wireless local area network access point, and wherein the second counter is to indicate a number of media access control protocol data units that have been received with a frame sequence check error by the wireless local area network access point. Example 22 may include the one or more non-transitory computer-readable media of claim 18, wherein the first counter is to indicate a number of messages received in association with carrier sense multiple access with collision avoidance by the wireless local area network access point and the second counter is to indicate a number of messages expected but not received in association with carrier sense multiple access with collision avoidance by the wireless local area network access point.

In various embodiments, example 23 may be one or more non-transitory computer-readable media comprising executable instructions, wherein the instructions, in response to execution by a computing system, cause the computing system to: begin a timer; send, based on expiry of the timer, a request to a wireless local area network access point for a value of a counter that is based on acknowledgment messages associated with carrier sense multiple access with collision avoidance by the wireless local area network access point; store a first value based on a response to the first request received from the wireless local area network access point; and send the first value to a network manager system. Example 24 may include the one or more non-transitory computer-readable media of claim 23, wherein the response is associated with a dot11ACKFailureCount field defined by an Institute of Electrical and Electronics Engineers 802.11 specification. Example 25 may include the one or more non-transitory computer-readable media of any of claims 23-24, wherein the storage of the first value comprises instructions to: compare the response to the request to a previous value associated with the counter; and store the first value based on the comparison.

In various embodiments, example 26 may be a method comprising beginning a timer; detecting that the timer has elapsed; reading, based on the detection that the timer has elapsed, a value of a first counter that is based on successful transmission or reception by the wireless local area network access point; storing a first value based on the value of the first counter; reading, based on the detection that the timer has elapsed, a value of a second counter that is based on errors in transmission or reception by the wireless local area network access point; storing a second value based on the value of the second counter; and computing an error rate value based on the first and second values. Example 27 may include the method of claim 26, wherein the computing of the error rate value based on the first and second values comprises: adding the first value and the second value; and dividing the second value by the sum of the first value and the second value. Example 28 may include the method of claim 26, wherein the first counter is to indicate a number of media access control service data units that have been successfully transmitted by the wireless local area network access point, and wherein the second counter is to indicate a number of media access control service data units that have not been successfully transmitted by the wireless local area network access point. Example 29 may include the method of claim 26, wherein the first counter is to indicate a number of media access control protocol data units of type data or management that have been successfully received by the wireless local area network access point, and wherein the second counter is to indicate a number of media access control protocol data units that have been received with a frame sequence check error by the wireless local area network access point. Example 30 may include the method of claim 26, wherein the first counter is to indicate a number of clear to send messages received in response to one or more ready to send messages by the wireless local area network access point and the second counter is to indicate a number of clear to send messages not received in response to one or more ready to send messages by the wireless local area network access point. Example 31 may include the method of any of claims 26-30, wherein the reading the value of the first counter comprises: transmitting, to the wireless local area network access point, a request for the value of the first counter; and receiving, from the wireless local area network access point, the value of the first counter. Example 32 may include the method of any of claims 26-30, wherein the storing of the first value comprises: comparing the value of the first counter to a previous value of the first counter; and storing the first value based on the comparing.

Example 33 may include the method of any of claims 26-30, further comprising: transmitting the error rate value to a network manager having an integration reference point manager.

Example 34 may be a method comprising: beginning a timer; detecting that the timer has elapsed; reading, based on the detection that the timer has elapsed, a value of a counter that is based on failure to detect one or more acknowledgment messages associated with data transmission by the wireless local area network access point; and storing the first value in the storage circuitry based on the value of the counter. Example 35 may include the method of claim 34, wherein the counter is associated with carrier sense multiple access with collision avoidance. Example 36 may include the method of claim 34, wherein the storing of the first value comprises: comparing the value of the counter to a previous value of the counter; and storing the first value based on the comparing. Example 37 may include the method of claim 34, wherein the reading of the value comprises: transmitting, to the wireless local area network access point, a request for the value of the counter; and receiving, from the wireless local area network access point, the value of the counter. Example 38 may include the method of any of claims 34-37, further comprising: transmitting the first value to a network manager having an integration reference point manager.

Example 39 may be an apparatus comprising: means for beginning a timer; means for detecting that the timer has elapsed; means for reading, based on the detection that the timer has elapsed, a value of a first counter that is based on successful transmission or reception by the wireless local area network access point; means for storing a first value based on the value of the first counter; means for reading, based on the detection that the timer has elapsed, a value of a second counter that is based on errors in transmission or reception by the wireless local area network access point; means for storing a second value based on the value of the second counter; and means for computing an error rate value based on the first and second values.

Example 40 may be an apparatus comprising: means for beginning a timer; means for detecting that the timer has elapsed; means for reading, based on the detection that the timer has elapsed, a value of a counter that is based on failure to detect one or more acknowledgment messages associated with data transmission by the wireless local area network access point; and means for storing the first value in the storage circuitry based on the value of the counter.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An element manager comprising:
    storage circuitry to store a first value associated with successful transmission or reception by a wireless local area network access point and a second value associated with errors in transmission or reception by the wireless local area network access point;
    a timer that is to elapse after a predefined period; and
    an integration reference point agent, coupled with the timer and the storage circuitry, to:
        begin the timer,
        detect that the timer has elapsed,
        transmit to the wireless local area network access point, based on the detection that the timer has elapsed, a request for
        a value of a first counter that is based on successful transmission or reception by the wireless local area network access point and a value of a second counter that is based on errors in transmission or reception by the wireless local area network access point,
        receive, based on the request, the values of the first and second counters,
        store the first value in the storage circuitry based on the value of the first counter,
        store the second value in the storage circuitry based on the value of the second counter, and
        compute an error rate value based on the first and second values stored in the storage circuitry.

2. The element manager of claim 1, wherein the integration reference point agent is to compute the error rate value based on the first and second values via division of the second value by a sum of the first value and the second value.

3. The element manager of claim 1, wherein the first counter is to indicate a number of media access control service data units that have been successfully transmitted by the wireless local area network access point, and wherein the second counter is to indicate a number of media access control service data units that have not been successfully transmitted by the wireless local area network access point.

4. The element manager of claim 1, wherein the first counter is to indicate a number of media access control protocol data units of type data or management that have been successfully received by the wireless local area network access point, and wherein the second counter is to indicate a number of media access control protocol data units that have been received with a frame sequence check error by the wireless local area network access point.

5. The element manager of claim 1, wherein the first counter is to indicate a number of clear to send messages received in response to one or more ready to send messages by the wireless local area network access point and the second counter is to indicate a number of clear to send messages not received in response to one or more ready to send messages by the wireless local area network access point.

6. The element manager of claim 1, wherein the integration reference point agent is to store the first value in the storage circuitry based on comparison of the value of the first counter to a previous value of the first counter.

7. The element manager of claim 1, wherein the integration reference point agent is to store the second value in the storage circuitry based on comparison of the value of the second counter to a previous value of the second counter.

8. The element manager of claim 1, wherein the integration reference point agent is to cause the error rate value to be transmitted to a network manager having an integration reference point manager.

9. The element manager of claim 8, further comprising:
    a network interface, coupled with the integration reference point agent, to transmit the error rate value to the network manager.

10. An element manager comprising:
    storage circuitry to store a first value associated with a failed data transmission by
    a wireless local area network access point;
    a timer that is to elapse after a predefined period; and
    an integration reference point agent, coupled with the timer and the storage circuitry, to:
        begin the timer,
        detect that the timer has elapsed,
        transmit to the wireless local area network access point, based on the detection that the timer has elapsed, a request for
        a value of a counter that is based on failure to detect one or more acknowledgment messages associated with data transmission by the wireless local area network access point,
        receive, based on the request, the value of the counter; and
        store the first value in the storage circuitry based on the value of the counter.

11. The element manager of claim 10, wherein the counter is associated with carrier sense multiple access with collision avoidance.

12. The element manager of claim 10, wherein the integration reference point agent is to store the first value based on comparison of the value of the counter to a previous value of the counter.

13. The element manager of claim 10, wherein the integration reference point agent is to transmit the request and receive the value of the counter using a simple network management protocol.

14. The element manager of claim 10, wherein the integration reference point agent is to cause the first value to be transmitted to a network manager having an integration reference point manager.

15. The element manager of claim 14, further comprising:
a network interface, coupled with the integration reference point agent, to transmit the first value to the network manager.

16. One or more non-transitory computer-readable media comprising executable instructions, wherein the instructions, in response to execution by a computing system, cause the computing system to:
begin a timer;
send, based on expiry of the timer, a first request to a wireless local area network access point for a value of a first counter associated with successful transmission or reception by the wireless local area network access point;
store a first value based on a response to the first request received from the wireless local area network access point;
send, based on expiry of the timer, a second request to a wireless local area network access point for a value of a second counter associated with unsuccessful transmission or reception by the wireless local area network access point;
store a second value based on a response to the second request received from the wireless local area network access point;
compute an error rate value based on the first and second values; and
send the computed error rate value to a network manager system.

17. The one or more non-transitory computer-readable media of claim 16, wherein the computation of the error rate comprises instructions to:
sum the first value and the second value; and
divide the second value by the sum.

18. The one or more non-transitory computer-readable media of claim 16, wherein the first counter is to indicate a number of media access control service data units that have been successfully transmitted by the wireless local area network access point, and wherein the second counter is to indicate a number of media access control service data units that have not been successfully transmitted by the wireless local area network access point.

19. The one or more non-transitory computer-readable media of claim 16, wherein the first counter is to indicate a number of media access control protocol data units of type data or management that have been successfully received by the wireless local area network access point, and wherein the second counter is to indicate a number of media access control protocol data units that have been received with a frame sequence check error by the wireless local area network access point.

20. The one or more non-transitory computer-readable media of claim 16, wherein the first counter is to indicate a number of messages received in association with carrier sense multiple access with collision avoidance by the wireless local area network access point and the second counter is to indicate a number of messages expected but not received in association with carrier sense multiple access with collision avoidance by the wireless local area network access point.

21. One or more non-transitory computer-readable media comprising executable instructions, wherein the instructions, in response to execution by a computing system, cause the computing system to:
begin a timer;
send, based on expiry of the timer, a request to a wireless local area network access point for a value of a counter that is based on acknowledgment messages associated with carrier sense multiple access with collision avoidance by the wireless local area network access point;
store a first value based on a response to the request received from the wireless local area network access point; and
send the first value to a network manager system.

22. The one or more non-transitory computer-readable media of claim 21, wherein the response is associated with a dot11ACKFailureCount field defined by an Institute of Electrical and Electronics Engineers 802.11 specification.

23. The one or more non-transitory computer-readable media of claim 21, wherein the storage of the first value comprises instructions to:
compare the response to the request to a previous value associated with the counter; and
store the first value based on the comparison.

* * * * *